(12) United States Patent
Pourshahid

(10) Patent No.: US 9,870,136 B2
(45) Date of Patent: *Jan. 16, 2018

(54) CONTROLLING VISUALIZATION OF DATA BY A DASHBOARD WIDGET

(71) Applicant: INTERNATIONAL BUSINESS MACHINES CORPORATION, Armonk, NY (US)

(72) Inventor: Alireza Pourshahid, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/352,706

(22) Filed: Nov. 16, 2016

(65) Prior Publication Data

US 2017/0068432 A1 Mar. 9, 2017

Related U.S. Application Data

(63) Continuation of application No. 15/132,713, filed on Apr. 19, 2016, now Pat. No. 9,582,171, which is a
(Continued)

(51) Int. Cl.
*G06F 3/0484* (2013.01)
*G06F 17/24* (2006.01)
*G06F 17/30* (2006.01)
*G06F 3/0482* (2013.01)
*G06F 17/21* (2006.01)
(Continued)

(52) U.S. Cl.
CPC ........ *G06F 3/04847* (2013.01); *G06F 3/0482* (2013.01); *G06F 3/0486* (2013.01); *G06F 17/212* (2013.01); *G06F 17/246* (2013.01);
*G06F 17/30554* (2013.01); *G06T 11/206* (2013.01); *G06T 2200/24* (2013.01)

(58) Field of Classification Search
None
See application file for complete search history.

(56) References Cited

U.S. PATENT DOCUMENTS 5,265,246 A 11/1993 Li et al.
6,529,217 B1 3/2003 Maquire, III et al.
(Continued)

OTHER PUBLICATIONS

Author: Microsoft Title: Gauges (Report Builder and SSRS) SQL Server 2012 Date: 2012 pp. 1-7.*
(Continued)

*Primary Examiner* — Ajay Bhatia
*Assistant Examiner* — Phoebe Pan
(74) *Attorney, Agent, or Firm* — Samuel A. Waldbaum

(57) ABSTRACT

Display data in a data graphical user interface (GUI) on a display device and display, by a processor, a control GUI on the display device representing the data. The control GUI includes a range defining visual element, corresponding to a data value, that is moveable via input received by the control GUI and defines two ranges of the data. The processor displays indicia associated with the range defining visual element indicating the corresponding data value. The processor receives input from the control GUI indicating the range defining visual element has been moved. In response, the processor visually emphasizes data in the data GUI having data values in a selected one of the defined data range.

1 Claim, 6 Drawing Sheets

Related U.S. Application Data continuation of application No. 14/176,180, filed on Feb. 10, 2014.

(51) Int. Cl.
*G06F 3/0486* (2013.01)
*G06T 11/20* (2006.01)

(56) References Cited

U.S. PATENT DOCUMENTS

| | | | |
|---|---|---|---|
| 6,906,717 | B2 | 6/2005 | Couckuyt et al. |
| 7,089,506 | B2 | 8/2006 | Gantenhammer et al. |
| 7,246,344 | B1 | 7/2007 | Christensen et al. |
| 7,278,101 | B1 | 10/2007 | Cassezza |
| 7,523,417 | B2 | 4/2009 | Hintermeister et al. |
| 7,574,652 | B2 * | 8/2009 | Lennon ............ G06F 17/30389 715/248 |
| 7,673,340 | B1 | 3/2010 | Cohen et al. |
| 7,756,907 | B2 | 7/2010 | Stolte et al. |
| 8,099,674 | B2 | 1/2012 | Mackinlay et al. |
| 8,321,805 | B2 | 11/2012 | Tien et al. |
| 8,627,232 | B2 | 1/2014 | Stiso et al. |
| 8,928,663 | B2 | 1/2015 | Budiu |
| 9,128,595 | B2 | 9/2015 | Muller |
| 9,418,347 | B2 | 8/2016 | George et al. |
| 9,495,473 | B2 * | 11/2016 | Gardner ............ G06F 17/30899 |
| 2004/0196286 | A1 | 10/2004 | Guzik |
| 2006/0224998 | A1 | 10/2006 | Riss et al. |
| 2007/0130113 | A1 * | 6/2007 | Ting ................. G06F 17/30554 |
| 2008/0033777 | A1 * | 2/2008 | Shukoor ............... G06Q 10/06 705/7.11 |
| 2008/0256099 | A1 | 10/2008 | Chodorov et al. |
| 2009/0150279 | A1 | 6/2009 | Hadar |
| 2009/0300544 | A1 | 12/2009 | Psenka et al. |
| 2010/0185984 | A1 | 7/2010 | Wright et al. |
| 2010/0198787 | A1 * | 8/2010 | Robertson ......... G06F 17/30389 707/634 |
| 2010/0235771 | A1 | 9/2010 | Gregg, III |
| 2010/0280759 | A1 | 11/2010 | Kagan et al. |
| 2011/0225525 | A1 | 9/2011 | Chasman et al. |
| 2012/0278321 | A1 | 11/2012 | Traub et al. |
| 2012/0304110 | A1 | 11/2012 | Chmiel et al. |
| 2013/0117651 | A1 | 5/2013 | Waldman et al. |
| 2013/0185624 | A1 * | 7/2013 | Appleyard ............ G06Q 10/10 715/234 |
| 2014/0129969 | A1 | 5/2014 | Chasman et al. |
| 2014/0136089 | A1 | 5/2014 | Hranac et al. |
| 2014/0152667 | A1 * | 6/2014 | Li ............................ G06T 1/00 345/440 |
| 2014/0229881 | A1 | 8/2014 | Schadewaldt et al. |
| 2014/0331159 | A1 * | 11/2014 | Hillary .................. G06Q 10/00 715/769 |
| 2015/0040048 | A1 * | 2/2015 | George ................. G06Q 30/02 715/769 |
| 2015/0040052 | A1 | 2/2015 | Noel et al. |
| 2015/0212663 | A1 | 7/2015 | Papale et al. |
| 2015/0227299 | A1 | 8/2015 | Pourshahid |
| 2015/0363081 | A1 | 12/2015 | Dai et al. |
| 2016/0154575 | A1 * | 6/2016 | Xie ..................... G06F 3/04842 715/771 |
| 2016/0162165 | A1 | 6/2016 | Lingappa |
| 2016/0179359 | A1 | 6/2016 | Kodejs et al. |
| 2016/0306806 | A1 * | 10/2016 | Fackler ............... G06F 17/3056 |
| 2016/0350950 | A1 * | 12/2016 | Ritchie ................ G06T 11/206 |
| 2017/0004638 | A1 * | 1/2017 | Csenteri ............... G06T 11/206 |
| 2017/0010776 | A1 * | 1/2017 | Stewart .............. G06F 3/04845 |
| 2017/0052669 | A1 * | 2/2017 | Li ........................ G06F 3/0486 |
| 2017/0091968 | A1 * | 3/2017 | George ................ G06T 11/206 |

OTHER PUBLICATIONS

Author Unknown, "Gauges & Meters", http://www.begraphic.com/docs/Gauges_documentation.pdf, Be Graphic, pp. 1-7.

Submitted by Tricia Aanderud on Dec. 14, 2011, "SAS BI: Conditional Highlighting for Reports", http://bi-notes.com/2011/12/sas-bi-conditional-highlighting-for-reports/, pp. 1-8.

Author Unknown, "Microsoft Excel 2007 to 2013-Conditional Formatting", http://www.homeandlearn.co.uk/excel2007/excel2007s6p2.html, pp. 1-5, Free computer Tutorials, Home & Learn.

Microstrategy, "Visual Conditional Formatting Editor", http://www2.microstrategy.com/producthelp/10/WebUser/WebHelp/Lang_1033/visual_conditional_formatting_editor.htm, Accessed on Feb. 3, 2014, pp. 1-2.

Pending U.S. Appl. No. 15/132,713, filed Apr. 19, 2016, entitled: "Controlling Visualization of Data by a Dashboard Widget", pp. 1-29.

ORACLE®, "Creating a Business Intelligence Dashboard Using Discoverer Portlets", Tutorial, Jul. 18, 2010, pp. 1-79.

Microsoft, "Add a Gauge to a Report (Report Builder and SSRS)" TechNetProductsIT ResourcesDownloadsTrainingSupport, 2012 2008 R2 2008 Previous Versions Library Forums, © 2013, pp. 1-6.

* cited by examiner

CONTROLLING VISUALIZATION OF DATA BY A DASHBOARD WIDGET

BACKGROUND

The present disclosure relates generally to visualization of data, and more particularly, to controlling the visualization of data by a graphical user interface.

Conditional formatting and data highlighting exist in business analytics and business information applications making it easier to locate critical data from amongst the masses of data available. Typical report authoring software supports methods to highlight data that falls within desired data thresholds and zones with effects such as color, bold font, and flashing backgrounds. Various products provide menus to define the desired data thresholds and zones, and to define the formatting options to support the authoring of conditional formatting for highlighting.

A typical way to display data is on a "dashboard," a dashboard being a visual display of the most important information needed to achieve one or more objectives. A dashboard consolidates and arranges information on a single screen, allowing the information to be monitored at a glance. A dashboard, may display data within predefined data thresholds, and include visual highlighting of certain important information.

SUMMARY

Embodiments of the present disclosure disclose a method, computer program product, and system for visualization of data. A processor displays data in a data graphical user interface (GUI) on a display device and displays a control GUI on the display device representing the data. The control GUI includes a range defining visual element, corresponding to a data value. The range defining visual element is moveable via input received by the control GUI and defines two ranges of the data. The processor displays indicia associated with the range defining visual element indicating the corresponding data value. The processor receives input from the control GUI indicating the range defining visual element has been moved. In response, the processor visually emphasizes data in the data GUI having data values in a selected one of the defined data range.

BRIEF DESCRIPTION OF THE SEVERAL VIEWS OF THE DRAWINGS

Features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

In computers, a data widget is an element of a graphical user interface (GUI) that displays information. Data widgets may be displayed as part of a dashboard, and may be any graphical representation of data including, but not limited to, tables, charts, lists, crosstabs, graphs, forms, text, and maps. Typically, the selection of key data within the data widget to highlight, or conditionally format, is neither intuitive nor interactive. Conditional formatting decisions for the data widget are typically pre-defined and static, preventing a dashboard user from easily and dynamically highlighting alternate data within the data widget. A business user may wish to more easily visualize new combinations of data presented in a data widget. Dynamically highlighting those various combinations, in an intuitive way, may improve dashboard usability. Embodiments of the present invention advantageously define a dashboard control widget to dynamically control the conditional formatting of a data widget on the dashboard. The dashboard control widget may allow for easier and more intuitive data highlighting control by providing the ability to dynamically alter highlighted data in the data widgets on the dashboard. Various embodiments of the dashboard control widget may include gauges, dials, slide bars, tables, and graphs. Control widgets may use interactive tabs, and pointers to identify a range of data in a data widget to highlight with conditional formatting. For exemplary purposes only, a gauge will be used as the control widget. A control widget, such as a gauge, empowers a dashboard user with limited technical skills to easily control data highlighting using the familiar widgets of business intelligence dashboards.

Figure 1:
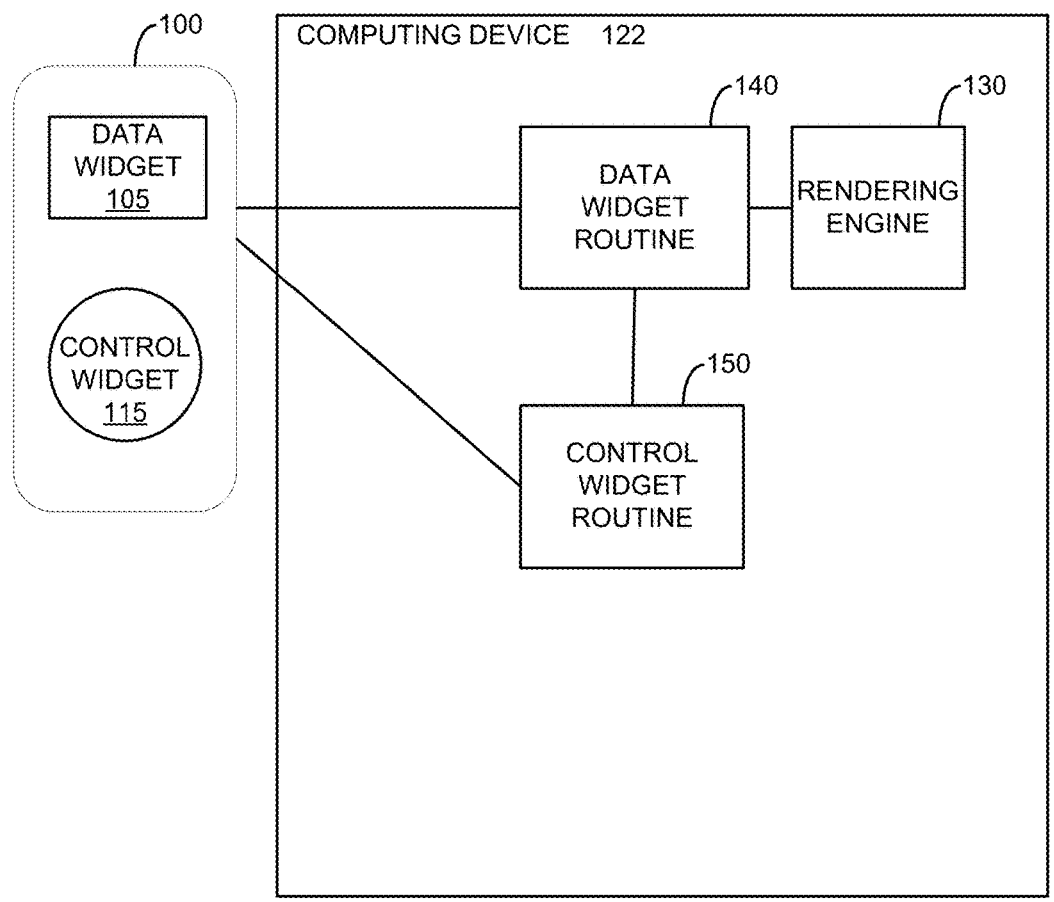
FIG. 1 illustrates a functional block diagram of a dashboard environment, in accordance with an embodiment of the disclosure.

FIG. 1 illustrates a functional block diagram of an exemplary dashboard environment 199, in accordance with an embodiment of the disclosure. Dashboard environment 199 includes computing device 122 and display device 100. Display device 100 may be used to display a dashboard including a data widget 105 and a control widget 115. In various embodiments, display device 100 may display a plurality of both data widgets 105 and control widgets 115.

In various embodiments, display device 100 may be a touch screen which allows users to make selections, move a cursor, or drag and drop widgets by touching the screen via a finger or stylus. In general, touch screens can recognize the size, shape, position, and movement of the touch and output this information to computing device 122. In various embodiments, display device 100 may allow users to make selections, move a cursor, and drag and drop widgets using a pointing device, such as a mouse. Any device that houses a display generally provides an Application Programming Interface (API). APIs are typically provided to allow programs on computing device 122 to obtain information from display device 100 whenever a touch or click, hereinafter "event", occurs on display device 100. Data widget 105 events and control widget 115 events may be recognized when a mouse pointer or touch has entered, touched, clicked, dragged, dropped, moved, or left the area of display device 100 covered by control widget 115 or data widget 105.

Figure 6:
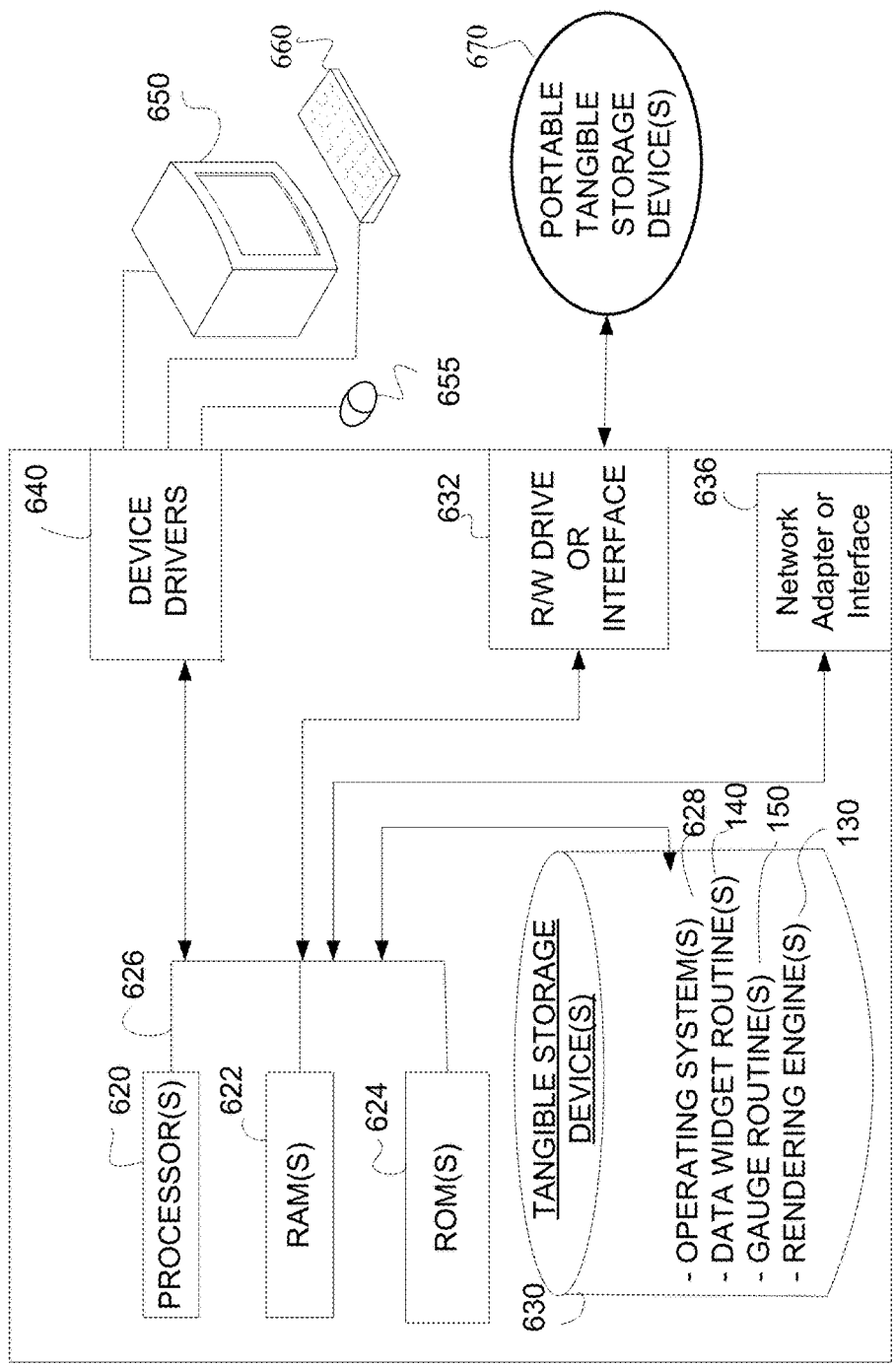
FIG. 6 depicts a block diagram of components of the computing device of a dashboard environment, in accordance with an embodiment of the disclosure.

Computing device 122 represents a computing device, system, or environment that includes one or more data widget routines 140, one for each data widget 105 on display device 100, and one or more control widget routines 150, one for each control widget 115 on display device 100, and rendering engine 130, all of which may be stored, for example, on a tangible storage device, such as tangible storage device(s) 630 (FIG. 6) or removable tangible storage devices(s) 670 (FIG. 6).

Computing device 122 may be a laptop computer, a notebook computer, a personal computer (PC), a desktop computer, a tablet computer, a thin client, a mobile phone or any other electronic device or computing system capable of performing the required functionality of embodiments of the disclosure. Computing device 122 may include internal and external hardware components, as depicted and described in further detail with respect to FIG. 6. In other various embodiments of the present disclosure, computing device 122 may represent a computing system utilizing clustered computers and components to act as a single pool of seamless resources. In general, computing device 122 is representative of any programmable electronic device or combination of programmable electronic devices capable of executing machine-readable program instructions in accordance with an embodiment of the disclosure.

Data widget routine 140 and control widget routine 150 may, in an embodiment execute as a result of a data widget 105 event or a control widget 115 event, on display device 100, for the routine's respective widget. For example, control widget routine 150 may execute when display device 100 detects data widget 105 has been dragged and dropped onto control widget 115.

A drag and drop event, performed on display device 100 by either a mouse click or touch, may "wire" data widget 105 together with control widget 115, creating a communication link that allows information to pass among the wired widget routines. This passed information includes an event name, a payload of content data, and a payload type. After widgets are wired together, an event occurring in one of the wired widgets, for example a mouse click of a cell in a table, initiates the passing of information to the wired widgets' routines. After the wired widgets' routines receive the information, a designated action takes place. For example, a page refreshes and display device 100 displays updated information. A drag and drop event that wires data widget 105 with control widget 115 also connects data widget routine 140 and control widget routine 150, establishing the link between the routines that enables control widget 115 to control the conditional formatting of data widget 105.

In various embodiments, data widget routine 140 may manage the data values and conditional formatting for data widget 105. Data widget routine 140 may communicate with rendering engine 130 to establish initial conditional formatting for the data widget 105 display and alter any conditional formatting, as necessary, whenever data widget 105 is updated or refreshed on display device 100. Data widget routine 140 may also communicate with control widget routine 150 as a result of a control widget 115 event on display device 100.

In various embodiments, control widget routine 150 may communicate with data widget routine 140 to receive the managed data values for data widget 105 and send formatting control information for data widget 105. Data widget routine 140 may utilize the formatting control information to update the conditional formatting of data widget 105. Data widget routine 140 may receive formatting control information, from control widget routine 150, for each control widget 115 event on display device 100. In an exemplary embodiment, control widget routine 150 is associated with an exemplary gauge control widget 115, or gauge. Control widget routine 150 may, in other embodiments, support other control widget implementations.

Rendering engine 130 may, in an embodiment receive control from data widget routine 140 to render the data widget 105 associated with data widget routine 140 for display on display device 100. Rendering engine 130 will be specific to the graphical representation of data widget 105, for example a chart rendering engine for a chart data widget. Typical rendering engines have known interfaces for receiving conditional formatting rules or conditional formatting definitions for a data widget.

Figure 2:
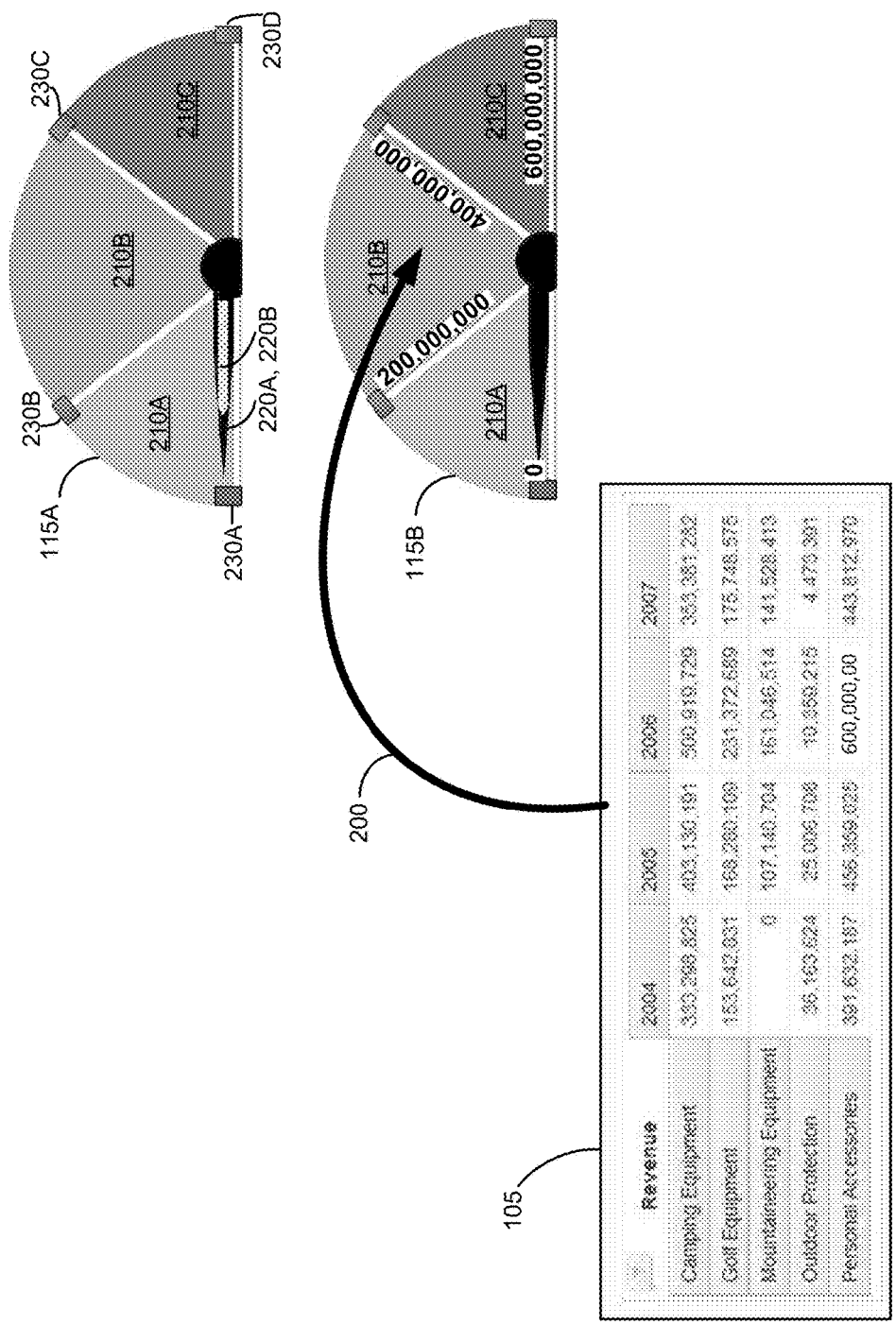
FIG. 2 is a block diagram of an exemplary dashboard data widget and control widget, in accordance with an embodiment of the disclosure.

FIG. 2 is a diagram of an exemplary dashboard data widget 105 and control widget 115, shown in two states 115A and 115B, in accordance with an embodiment of the disclosure. On the exemplary dashboard of FIG. 2, the control widget 115 is shown as a gauge. Exemplary gauge 115A represents the gauge as it may appear on the dashboard before being wired to a data widget. Gauge 115A includes a plurality of zones 210A, 210B, 210C, which subdivide the gauge 115A. No data has yet been associated with the zones 210. The plurality of zones may have distinguishable visual characteristics, such as color, to visually subdivide the gauge 115. In an embodiment, after data is associated with the gauge, a green zone may indicate a good data range, a yellow zone may indicate an acceptable data range, and a red zone may indicate an unacceptable data range. Various gauge embodiments may include interactive zone tabs 230A, 230B, 230C, 230D to adjust the beginning or end of zones 210, and interactive range pointers 220A, 220B, to identify the range of data to be conditionally formatted, or, for example, visually emphasized or highlighted, in the data widget. Certain embodiments may allow gauge display characteristics to be user defined. For example, the number of zones displayed, the visual characteristics associated with each zone 210A, 210B, 210C, and the formula determining the data value, hereinafter "zone threshold", at the beginning and end of each zone 210A, 210B, 210C, may be based in whole or in part on user input. For example, one exemplary formula may set the zone thresholds such that the data range is divided equally among the zones 210. Another exemplary formula may set the zone thresholds based on a statistical model, such as a standard deviations associated with a bell curve of the data values.

Various embodiments may dynamically wire a data widget 105, for example a revenue table whose formatting is to be controlled by a control widget, to the control widget 115A, 115B. In various embodiments, the revenue table 105 may be dragged and dropped onto the exemplary gauge 115B. The drag and drop gesture may be accomplished either by touch or mouse click. The exemplary drag and drop gesture 200 may wire data widget routine 140, for revenue table 105, with control widget routine 150, for gauge 115B, and establish a communication link between them. In various embodiments, after revenue table 105 is dragged and dropped on gauge 115B, control widget routine 150 may execute, as a result of the drag and drop event on display device 100. Control widget routine 150 may send a "get data" request to the data widget routine 140 wired to control widget routine 150 to obtain the data used by revenue table 105. Certain embodiments may utilize a publish/subscribe model to communicate. Control widget routine 150 may listen for a "sent data" request from the wired data widget routine 140 and receive payload data that may include, but is not limited to, the range of data values in revenue table 105, all data values in revenue table 105, and sample data values in revenue table 105. For example, a drag and drop of revenue table 105 onto gauge 115B sends a payload including the range of data values in revenue table 105 (0 to 600,000,000). Various embodiments may send a payload of all data values represented by a data widget 105, even if the data widget 105 displays only a subset of all the data. Control widget routine 150 may utilize the received data ranges or data values to initially establish zones 210A, 210B, 210C and zone thresholds for each of the zones. Exemplary gauge 115B displays the results of a drag and drop of revenue table 105 onto gauge 115B. Exemplary gauge 115B includes three zones 210A, 210B, 201C, the zone thresholds divided equally among the zones 210, for the revenue table 105 data range of 0-600,000,000 (i.e., zone thresholds of 0, 200,000,000, 400,000,000, and 600,000,000).

In certain embodiments, control widget 115 may control the conditional formatting of a plurality of data widgets 105 simultaneously or control various data widgets 105 on the dashboard at different times. In an embodiment with multiple data widgets 105 controlled simultaneously by a single control widget 115, zones 210 may reflect a superset of all the data ranges of the plurality of data widgets 105 wired to the same control widget 115. All the data widget routines 140 associated with the plurality of controlled data widgets 105 may be able to communicate with control widget routine 150. Control widget routine 150 may dynamically update zones and zone thresholds as data widgets 105 are wired to and unwired from the control widget 115. In certain embodiments, all the wired data widget routines 140 may additionally communicate with each other.

Figure 3:
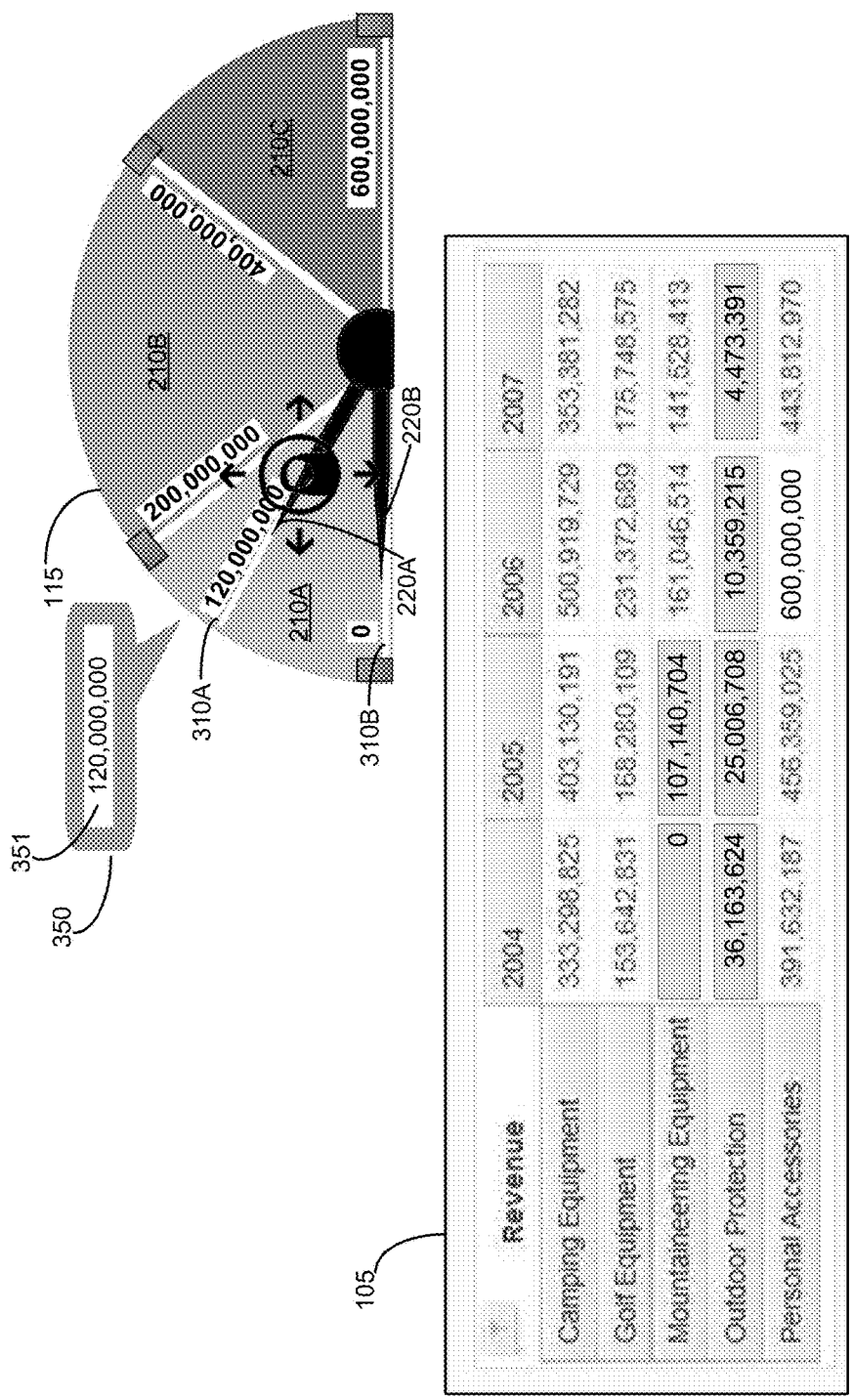
FIG. 3 is a block diagram of an exemplary revenue table dashboard data widget and gauge control widget, in accordance with an embodiment of the disclosure.

FIG. 3 is a block diagram of an exemplary revenue table dashboard data widget 105 and gauge control widget 115, in accordance with an embodiment of the disclosure. Various embodiments may allow interactive, movable, range pointers 220A, 220B on gauge 115 that define the bounds, or range, of data values in revenue table 105 to be highlighted. Each range pointer 220A, 220B may be associated with a range bound value 310A, 310B. Certain embodiments may initialize the range bound values 310 to 0, indicating no highlighting, when gauge 115 is initialized. Various embodiments may allow a mouse click or touch event to drag range pointers 220. In certain embodiments, control widget routine 150 may execute as a result of a range pointer 220A, 220B drag and drop event on display device 100. In other embodiments, control widget routine 150 may execute multiple times during the drag of a range pointer 220A, 220B, resulting from range pointer 220 "position change" events on display device 100. Control widget routine 150 may utilize the position payload information, received with the position change event or drag and drop event, to determine a new range bound value 310 represented by the repositioned range pointer 220A, 220B. In various embodiments, gauge 115 may determine the angle of the repositioned range pointer 220A from the position payload information received and may utilize the angle and data values represented by gauge 115 to determine the new range bound value 310A. Other mechanisms may utilize position payload information received from display device 100 to proportionally determine the range bound value 310A, 310B for various other types of control widgets, for example a slide. In certain embodiments, control widget routine 150 may recognize additional range pointer 220 events such a double mouse click or double touch that occurs over a portion of display device 100 covered by the range pointer 220A, 220B. Control widget routine 150 may, on a double click, double touch, or other range pointer event create a popover 350 that provides an input field 351 for entering a value that will become the range bound value 310A, 310B for the clicked or touched range pointer 220A, 220B. Control widget routine 150 may display a repositioned range pointer 220A, 220B that reflects the range bound value 310A, 310B entered in the popover 350 input field 351, exactly as if the range pointer 220A, 220B had been dragged to the equivalent range bound value 310A, 310B.

After control widget routine 150 determines the new range bound values 310, control widget routine 150 may send a "highlight update" event to any data widget routines 140 wired to control widget routine 150 with a payload that includes the range bound values 310, zone threshold values, and zone visual characteristics (such as color). Data widget routine 140 may listen for the "highlight update" event and update its conditional formatting information for data points within the range bound values 310 utilizing the input zone threshold values and zone visual characteristics. Data widget routine 140 may pass control to its rendering engine 130 to re-render the data widget 105 based on the updated conditional formatting information that reflects the zone visual characteristics for data points within the input range bound values 310A, 310B. Data widget routine 140 may refresh display device 100 with the re-rendered data widget 105. Any data point in the re-rendered data widget 105 whose value is within the range bound values 310A, 310B may be highlighted with its corresponding characteristic from the zone 210A, 210B, 210C. Range bound values 310 may span multiple zones 210 causing data widget 105 data points to be highlighted with multiple visual characteristics, each data point's visual characteristic corresponding to the visual characteristic of the zone 210A, 210B, 201C in which the data value resides.

The exemplary gauge 115 and revenue table 105 illustrate range bound values 310A, 310B of 0 and 120,000,000 and revenue table 105 data points between 0 and 120,000,000 highlighted with the visual characteristic of the gauge zone 210A, 210B, 210C. In certain embodiments, a single range pointer 220A may be used, separating the exemplary gauge 115 into two ranges, 0—range bound value 310A and range bound value 310A—600,000,000. The range bound values 310 included in the payload to data widget routine 140 may be determined by a gauge 115 event such as a mouse click or touch on one of the two ranges, or may default to either the lower range of data values or the higher range of data values.

Figure 4:
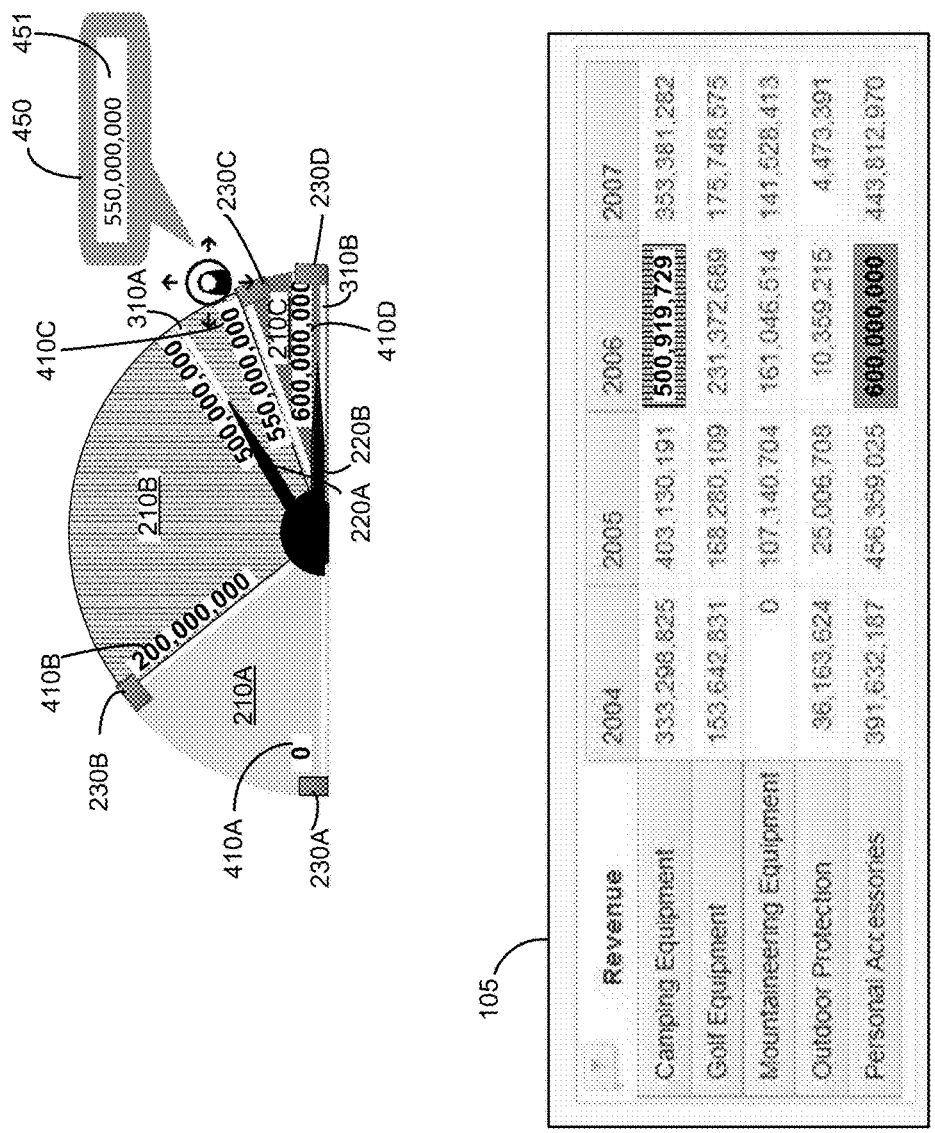
FIG. 4 is a block diagram of an exemplary revenue table dashboard data widget and gauge control widget, in accordance with an embodiment of the disclosure.

FIG. 4 is a block diagram of an exemplary revenue table dashboard data widget 105 and gauge control widget 115, in accordance with an embodiment of the disclosure. Similar to the interactive, movable range pointers 220A, 220B described above, with reference to FIG. 3, various embodiments may allow interactive, movable, zone tabs 230A, 230B, 230C, 230D on gauge 115 to dynamically adjust the zone thresholds 410A, 410B, 410C, 410D of gauge 115. Various embodiments may allow a mouse click or touch event to drag zone tabs 230. In certain embodiments, control widget routine 150 may execute as a result of a zone tab 230 drag and drop event on display device 100. In other embodiments, control widget routine 150 may execute multiple times during the drag of zone tab 230A, 230B, 230C, 230D, resulting from zone tab 230 "position change" events on display device 100. Control widget routine 150 may utilize the position payload information, received with the position change event or drag and drop event, to determine a new zone threshold 410 represented by the repositioned zone tab 230A, 230B, 230C, 230D. In various embodiments, gauge 115 may determine the angle of the repositioned zone tab 230A, 230B, 230C, 230D from the position payload information received and may utilize the angle and data values represented by gauge 115 to determine the zone threshold 410A, 410B, 410C, 410D. Other mechanisms, may utilize position payload information received from display device 100 to proportionally determine the zone threshold 410A, 410B, 410C, 410D for various other types of control widgets, for example a slide. In certain embodiments, control widget routine 150 may recognize additional zone tab 230 events such a double mouse click or double touch that occurs over a portion of display device 100 covered by the zone tab 230A, 230B, 230C, 230D. Control widget routine 150 may, on a double click, double touch, or other zone tab event create a popover 450 that provides an input field 451 for entering a value that will become the zone threshold 410A, 410B, 410C, 410D for the clicked or touched zone tab 230A, 230B, 230C, 230D. Control widget routine 150 may display a repositioned zone tab 230 that reflects the zone threshold 410A, 410B, 410C, 410D entered in the popover 450 input field 451, exactly as if the zone tab 230A, 230B, 230C, 230D had been dragged to the equivalent zone threshold 410A, 410B, 410C, 410D. The exemplary gauge 115 zone tab 230C repositioned to a zone threshold 410C of 550,000,000, causes range bound values 310A, 310B to span zones 210.

After control widget routine 150 determines the new zone thresholds 410A, 410B, 410C, 410D, control widget routine 150 may send a "highlight update" event to any data widget routines 140 wired to control widget routine 150 with a payload that includes the range bound values 310, new zone thresholds 410, and zone visual characteristics (such as color). As described above, with reference to FIG. 3, data widget routine 140 may listen for the "highlight update" event, update its conditional formatting information, pass control to its rendering engine 130, and refresh display device 100 with the re-rendered data widget 105 that reflects the updated gauge zone thresholds 410.

The exemplary gauge 115 and revenue table 105 illustrate range bound values 310A, 310B of 500,000,000 and 600,000,000 which span gauge zones 210. Revenue table 105 data points between 500,000,000 and 600,000,000 are highlighted with the visual characteristics of their respective gauge zones 210A, 210B, 210C.

Figure 5:
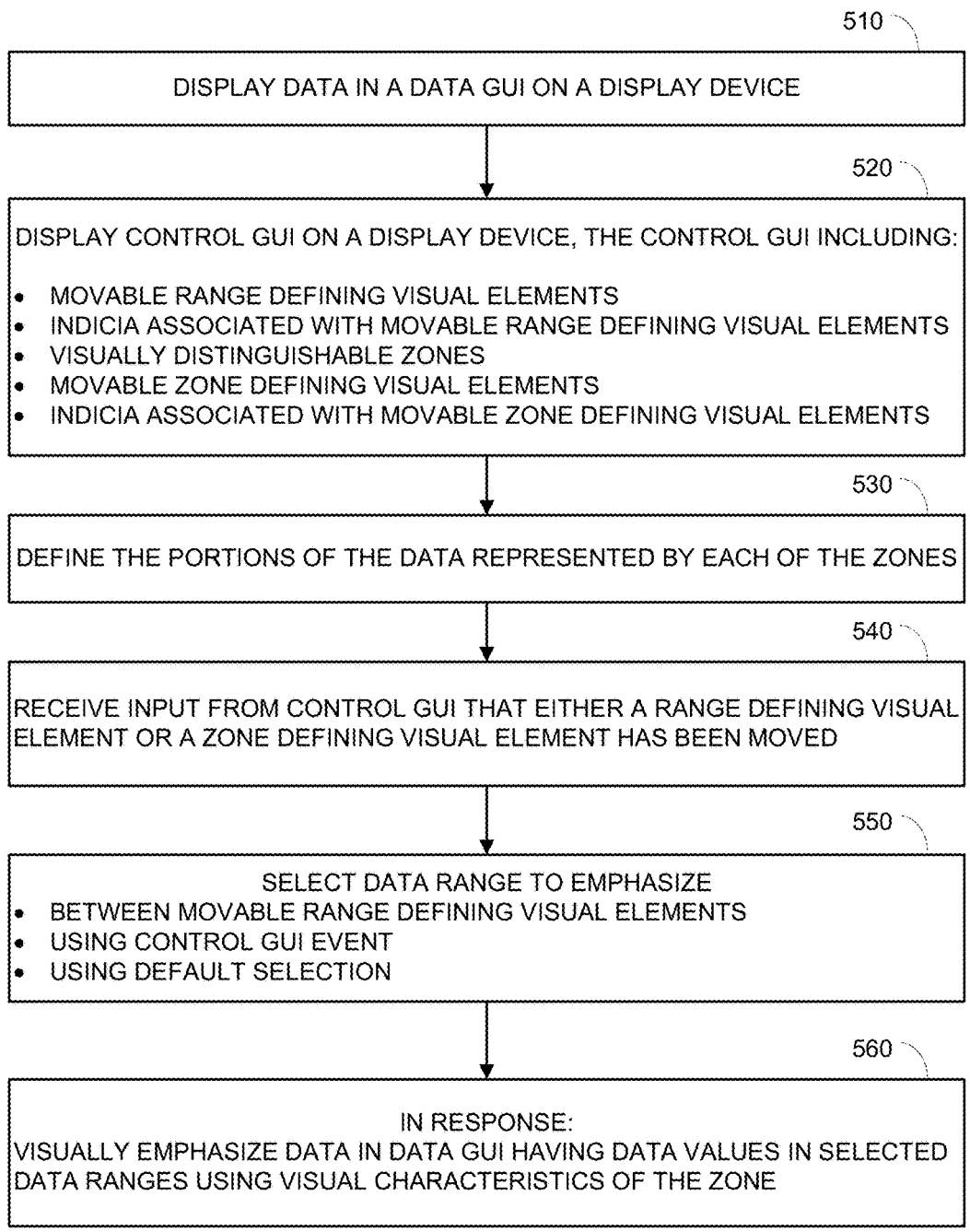
FIG. 5 is a flowchart illustrating the operation for visualization of data, in accordance with an embodiment of the disclosure.

FIG. 5 is a flowchart illustrating the operation for visualization of data, in accordance with an embodiment of the disclosure. The computing device 122 may, at 510, display data in a data GUI, or data widget 105, on display device 100. The computing device 122 may additionally display, at 520, a control GUI, or control widget 115, on display device 100. The control widget 115 represents the data in data widget 105. The data widget 105 and control widget 115 may be displayed in a dashboard. The control widget 115 may include one or more movable range defining visual elements, or range pointers 220, that correspond to a data value. The range pointers 220 may be moved by range pointer 220A, 220B events on display device 100, such as a mouse click or touch. A single range pointer 220A may separate the control widget 115 into two data ranges. Multiple range pointers 220 may separate the control widget into multiple data ranges. The control widget 115 may also include indicia, or range bound values 310, displaying the data values that correspond with the range pointers 220. Additionally, the control widget 115 may include zones 210 representing definable portions of the data represented by the control widget 115. Each zone 210A, 210B, 210C may have visual characteristics to distinguish them. The zones 210 may be separated by movable zone defining visual elements, or zone tabs 230, that each correspond to a data value, and indicia, or zone thresholds 410, displaying the data values that correspond with each zone tab 230A, 230B, 230C, 230D. The zone tabs 230 may be moved by zone tab 230A, 230B, 230C, 230D events on display device 100, such as a mouse click or touch.

Computing device 122 may, at 530, define the portions of the data represented by each zone 210A, 210B, 210C and set the zone thresholds 410 when a data widget 105 is wired to the control widget 115. The number of zones 210 and visual characteristics of the zones 210 may be pre-defined, implementation dependent, or user specified. Control widget 115 may represent the data values of data widget 105. The portions of the data represented be each zone 210A, 210B, 210C may be pre-defined, implementation dependent, or user specified.

Computing device 122 may receive input, at 540, from a control widget 105 event whenever a range pointer 220A, 220B or zone tab 230A, 230B, 230C, 230D is moved. Certain embodiments may also receive input from additional control widget events, such as a double click. In response to the control widget 115 event, computing device 122 may, at 550, select the control widget 115 data range to emphasize. In various embodiments, the selected data range may be the data values between two range pointers 220A, 220B. In certain embodiments with only one range pointer 220A, or more than two range pointers 220, the selected data range, or data ranges, may be pre-defined or may require additional control widget 115 events, such as a mouse click or touch on the desired data range. In certain environments, a control widget 115 event such as a SHIFT+mouse click may select more than one data range to be visually emphasized.

Computing device 122, may, at 560, visually emphasize the data, in data widget 105, having data values in the selected data range(s). The data in data widget 105 may be visually emphasized, for example, by changing size, changing color, changing font, changing background, and applying special effects to the data. Certain embodiments may visually emphasize the data with the visual characteristics of the control widget 115 zones 210 representing the data in the selected data range(s). Certain other embodiments may visually emphasize the data with pre-defined, implementation specific, or user specified visual characteristics.

Although aspects of the invention have been described in relation to an exemplary embodiment that uses a gauge control widget and a table data widget, those of skill in the art will recognize that other embodiments may be used. For example, the data widget may be a chart, map, list, text, crosstab, form, graph, or any graphical representation of data and the control widget may be a dial, slide bar, table, graph, or any graphical representation of a controller.

FIG. 6 depicts a block diagram of components of the computing device 122 of the dashboard environment 199 of FIG. 1, in accordance with an embodiment of the present invention. It should be appreciated that FIG. 6 provides only an illustration of one implementation and does not imply any limitations with regard to the environments in which different embodiments may be implemented. Many modifications to the depicted environment may be made.

Computing device 122 can include one or more processors 620, one or more computer-readable RAMs 622, one or more computer-readable ROMs 624, one or more tangible storage devices 630, device drivers 640, read/write drive or interface 632, and network adapter or interface 636, all interconnected over a communications fabric 626. Communications fabric 626 can be implemented with any architecture designed for passing data and/or control information between processors (such as microprocessors, communications and network processors, etc.), system memory, peripheral devices, and any other hardware components within a system.

One or more operating systems 628, data widget routines 140, control widget routines 150 (FIG. 1), and rendering engines 130 are stored on one or more of the computer-readable tangible storage devices 630 for execution by one or more of the processors 620 via one or more of the respective RAMs 622 (which typically include cache memory). In the illustrated embodiment, each of the computer-readable tangible storage devices 630 can be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 122 can also include a R/W drive or interface 632 to read from and write to one or more portable computer-readable tangible storage devices 670. Data widget routine 140, control widget routine 150, and rendering engine 130 on computing device 122 can be stored on one or more of the portable computer-readable tangible storage devices 670, read via the respective R/W drive or interface 632, and loaded into the respective computer-readable tangible storage device 630.

Computing device 122 can also include a network adapter or interface 636, such as a TCP/IP adapter card or wireless communication adapter (such as a 4G wireless communication adapter using OFDMA technology). Data widget routine 140, control widget routine 150, and rendering engine 130 on computing device 122 can be downloaded to the computing device from an external computer or external storage device via a network (for example, the Internet, a local area network or other, wide area network or wireless network) and network adapter or interface 636. From the network adapter or interface 636, the programs are loaded into the computer-readable tangible storage device 630. The network may comprise copper wires, optical fibers, wireless transmission, routers, firewalls, switches, gateway computers, and/or edge servers.

Computing device 122 can also include a display screen 650, a keyboard or keypad 660, and a computer mouse or touchpad 655. Device drivers 640 interface to display screen 650 for imaging, to keyboard or keypad 660, to computer mouse or touchpad 655, and/or to display screen 650 for pressure sensing of alphanumeric character entry and user selections. The device drivers 640, R/W drive or interface 632, and network adapter or interface 636 can comprise hardware and software (stored in computer-readable tangible storage device 630 and/or ROM 624).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the invention, and these are, therefore, considered to be within the scope of the invention, as defined in the following claims.

What is claimed is:

1. A computer program product for visualization of data by a display device, the computer program product comprising:
   one or more non-transitory computer-readable storage media and program instructions stored on the one or more non-transitory computer-readable storage media, the program instructions comprising:
   sending a first data that is to be organized to a computing device;
   receiving a first managed data from the computing device, comprising values and formatting information as to how the first data that is to be organized should be displayed, where the first managed data includes data values;
   displaying the first managed data in a gauge in accordance to the received formatting information, and the data values through a user graphical interface, wherein the gauge is a graphical interface control element representing the first managed data, wherein the first managed data includes a plurality of data values that breaks the gauge into regions, wherein each region is displayed in a different color;
   receiving alternation of at least one of the plurality of data values that breaks the gauge into regions, wherein a user altered the at least one of the plurality of data values that breaks the gauge into regions by dragging and dropping a second data on to the gauge;
   sending the at least one of the plurality of data values that breaks the gauge into regions that was altered to the computing device;
   receiving a second managed data comprising values and formatting information wherein the second managed data adjust the first managed data to reflect the at least one of the plurality of data values that breaks the gauge into regions that was altered, wherein the second managed data is based on the first data and the second data; and
   in response, visually emphasizing regions in the display gauge wherein each region represents a set of data values.

* * * * *